United States Patent [19]

Schafheutle et al.

[11] Patent Number: 5,525,669
[45] Date of Patent: Jun. 11, 1996

[54] AQUEOUS EMULSIONS COMPRISING POLYVINYL BUTYRAL

[75] Inventors: Markus A. Schafheutle, Hochheim; Gerhard Merten, Wiesbaden, both of Germany

[73] Assignee: Hoechst Aktiengesellschaft, Frankfurt, Germany

[21] Appl. No.: 286,252

[22] Filed: Aug. 8, 1994

[30] Foreign Application Priority Data

Aug. 14, 1993 [DE] Germany ............... 43 27 369.6

[51] Int. Cl.$^6$ .................. C08J 3/00; C08K 3/20; C08L 75/00; C08L 29/04

[52] U.S. Cl. ............. 524/507; 523/336; 524/366; 524/376; 524/377; 524/378; 524/379; 524/389; 524/503; 524/512; 524/513; 524/517; 524/557; 524/589; 524/591; 524/839; 427/372.2; 427/385.5

[58] Field of Search .............. 523/336; 524/366, 524/376, 377, 378, 379, 389, 503, 507, 512, 513, 517, 557, 589, 591, 839; 427/372.2, 385.5

[56] References Cited

U.S. PATENT DOCUMENTS

| | | | |
|---|---|---|---|
| 2,509,667 | 5/1950 | Ballinger | 200/52 |
| 2,532,223 | 11/1950 | Bromley, Jr. | 260/23 |
| 2,611,755 | 9/1952 | Bromley, Jr. | 260/29.6 |
| 2,686,724 | 8/1954 | Chenicek | 99/163 |
| 3,234,161 | 2/1966 | Snelgrove et al. | 524/557 |
| 4,886,845 | 12/1989 | Becker et al. | 523/403 |

FOREIGN PATENT DOCUMENTS

| | | |
|---|---|---|
| 0152793 | 8/1985 | European Pat. Off. . |
| 58-026374 | 6/1983 | Japan . |

OTHER PUBLICATIONS

Derwent Publications, Ltd., AN 79–53570B and JP–A–54 072 255, published Jun. 9, 1979.

Derwent Publications, Ltd., AN 72–78296T and JP–B–53 035 980, published Sep. 29, 1978.

Primary Examiner—Paul R. Michl
Assistant Examiner—Patrick Niland
Attorney, Agent, or Firm—Foley & Lardner

[57] ABSTRACT

Aqueous emulsions which include polyvinyl butyral are prepared by mixing a nonionic emulsifier with polyvinyl butyral and, if desired, with a plasticizer resin and, if desired, with one or more solvents, and adding water under the action of shear forces.

20 Claims, No Drawings

1

AQUEOUS EMULSIONS COMPRISING POLYVINYL BUTYRAL

BACKGROUND OF THE INVENTION

1. Field of the Invention

The present invention relates to aqueous emulsions containing polyvinyl butyral and processes for their preparation and methods of their use.

2. Description of Related Art

Aqueous emulsions which include polyvinyl butyral are known. The emulsifiers they contain are in most cases anionic compounds such as salts of fatty acids, alkanesulfonates or alkyllaurylsulfonates. See U.S. Pat. Nos. 2,686,724, 2,532,223, 2,611,755, and 2,509,667.

However, emulsions of this kind, i.e., containing ionic emulsifiers, are sensitive to changes in pH, and therefore are not suitable for every application. Emulsions containing nonionic emulsifiers, on the other hand, are stable to pH change.

JP-A 58/026374 describes aqueous emulsions of polyvinyl butyral which are free of anionic emulsifiers. These emulsions contain not only the polyvinyl butyral but also polyvinyl alcohol, a so-called plasticizer resin, in order to improve the film-forming properties and the elasticity. The emulsions also must contain a so-called petroleum resin to achieve sufficient stability of the dispersion. These emulsions have to be prepared under pressure.

SUMMARY OF THE INVENTION

One object of the present invention is to provide nonionic emulsions which include polyvinyl butyral and which can be prepared without employing elevated pressure and, accordingly, by a simpler process carried out at about atmospheric pressure.

Another object of the present invention is to provide an emulsion of polyvinyl butyral which is stable (i.e. which does not segregate upon storage) without the addition of petroleum resin, which latter lowers the solvent resistance of coatings prepared with such emulsions.

Another object of the present invention is to provide a process for the production of polyvinyl butyral-containing emulsions. Another object of the present invention is to provide an emulsion prepared by the process.

Another object of the invention is to provide methods of using such emulsions, for example, as coating compositions or as films.

In accomplishing the foregoing objects, there has been provided according to the present invention a process for the production of an aqueous polyvinyl butyral containing emulsion. The process includes the steps of: (i) mixing a nonionic emulsifier with a polyvinyl butyral to form a mixture; (ii) subjecting the mixture to shear forces; and (iii) adding water to the mixture while the mixture is subjected to the shear forces, to form the emulsion.

In a preferred embodiment an aromatic and/or aliphatic polyisocyanate is added during the process to modify the emulsion. In another preferred embodiment, a polyacid is added during the process to modify the emulsion.

Another aspect of the present invention provides a emulsion made by the process of the present invention.

Another aspect of the present invention provides a coating formulation which includes such an emulsion, and a method for coating a substrate with such an emulsion.

Further objects, features and advantages of the present invention will become apparent from the detailed description of the preferred embodiments which follows.

DETAILED DESCRIPTION OF THE PREFERRED EMBODIMENTS

The present invention relates to aqueous emulsions comprising polyvinyl butyral which are prepared by mixing a nonionic emulsifier with polyvinyl butyral and, if desired, with a plasticizer resin and, if desired, with one or more solvents. Water is then added under the action of shear forces.

The emulsifiers used are generally any available, nonionic emulsifiers, for example, polyvinyl alcohol preferably having a degree of hydrolysis from about 50 to 98%, ethoxylated fatty alcohols or alkylphenols, preferably containing from 10 to 50 units of ethylene oxide. Preferred emulsifiers are the products of the condensation of an aliphatic polyol with a polyepoxide compound, the epoxide equivalent weight (molecular mass divided by the number of epoxide groups) of these condensation products being between about 200 and 150,000 g/mol, preferably from about 400 to 100,000 g/mol. These emulsifiers are described in U.S. Pat. No. 4,886,845, which is hereby incorporated by reference in its entirety.

Although any suitable aliphatic polyol can be used, the aliphatic polyols preferably used in the preparation of these emulsifiers are polyetherpolyols (polyalkylene glycols) having weight-average molecular masses ($M_w$) (as determined by gel permeation chromatography with a polystyrene standard) of preferably from about 600 to 120,000 g/mol, in particular from about 2000 to 8000 g/mol, and OH numbers which are advantageously from about 10 to 200 and preferably from about 15 to 60 mg of KOH/g. These polyetherpolyols preferably contain only terminal, primary OH groups. Polyetherpolyols which can be used in this context are block copolymers of ethylene oxide and propylene oxide, and also polyethylene glycols, polypropylene glycols and polybutylene glycols, and mixtures of these respective polyalkylene glycols. It is preferred to use polyethylene glycols.

Although any suitable polyepoxide compound can be used in the preparation of the emulsifiers, the polyepoxide compounds are preferably polyglycidyl ethers based on polyhydric, preferably dihydric, alcohols, phenols, hydrogenation products of these phenols and/or novolaks (reaction products of mono- or polyhydric phenols with aldehydes, especially formaldehyde, in the presence of acidic catalysts). The epoxide equivalent weights of these epoxide compounds are preferably between about 160 and 500 g/mol, in particular between about 170 and 250 g/mol. Examples of polyhydric phenols which can be mentioned are: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4-hydroxyphenyl)isobutane, 2,2-bis(4-hydroxy-tert-butylphenyl)propane,bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone and the like, and the chlorination and bromination products of the above-mentioned compounds, for example tetrabromobisphenol A. Although any suitable polyhydric phenol can be used, bisphenol A is particularly preferred in this context.

In order to improve the film-forming properties and the flexibility of the films, the emulsions according to the present invention can advantageously also contain so-called plasticizer resins. Although any suitable so-called plasticizer resin can be used, plasticizer resins of the conventional type, for example phenolic resins, epoxy resins, novolaks and dialkyl phthalates are preferred. More preferred plasticizer resins are the reaction products of bisphenol A diglycidyl ether, bisphenol A and phenol, as described in EP-A 152,793, which is hereby incorporated by reference in its entirety. The emulsions claimed may also contain, if desired, solvents such as, Solvesso® 100 (mixture of aromatic compounds with various substitution patterns), toluene, xylene, benzine, and alcohols such as butanol, butylglycol, methoxypropanol, Arcosolv® (1,2-propylene glycol mono-t.-butylether) and tert-butoxypropanol. However, any suitable solvent may be used.

Suitable polyvinyl butyrals for the emulsions of the present invention are all conventional and known types of polyvinyl butyral. Conventional types of polyvinyl butyral have the following characteristics, for example: the viscosity of an about 6% strength solution in methanol at about 20° C. is from about 1 to 200 mPa.s; the degree of acetalization is from about 65 to 90% (calculated as polyvinyl acetate); the acetate content is about 2–5% (calculated as polyvinyl acetate); the content of OH groups is from about 15 to 30% (calculated as polyvinyl alcohol). However, any suitable polyvinyl butyral having other characteristics can be used.

The respective components are generally present in the emulsion in the following preferred proportions by mass: polyvinyl butyral—from about 10 to 99%, in particular from about 30 to 70%; plasticizer resin—in an amount effective to improve the film-forming properties and the flexibility of the film, usually from about 0 to 90%, in particular from about 30 to 70%; solvent—from about 0 to 50%, in particular from 0 to 20%; and emulsifier—from about 1 to 20%, in particular from about 1 to 10%. All contents by mass are related to the overall mass of the solids in the emulsion and should add up to give 100%. Although the above ranges are preferred, any suitable proportion of components can be used.

In a preferred method of preparing the emulsion, the emulsifier and, if desired, the plasticizer resin and the solvent are first heated to a temperature of from approximately 60° to 100° C. and mixed to form an emulsifier mixture. The polyvinyl butyral is then added and is dissolved with the emulsifier or with the mixture thereof with the plasticizer, at temperatures of from approximately 50° to 150° C. If necessary, the solution is subsequently cooled to below about 100° C. and water is metered in. During the addition of the water, the mixture is cooled further to below about 75° C. When the emulsion has reached a solids content of from approximately 60 to 70%, the addition of water is terminated, but the emulsion is stirred thoroughly for about one hour more, its temperature being maintained at below about 70° C. by cooling. Finally, the emulsion is diluted further to the desired final concentration (approximately from about 20 to 60% based on the total weight of the emulsion).

The emulsification process is carried out using conventional apparatus which provides an adequate shear effect. As examples, vessels with an appropriate stirrer, such as a rotor-stator dispermat or an Ultra-Turrax can be used. The stirrer velocity is in excess of 2 m/s, preferably more than 2,5 m/s. This latter apparatus has the advantage that the initial mixing procedure is not carried out in the emulsification vessel, and therefore a higher vessel yield is ensured. However, any suitable stirring vessel can be used. The process is preferably carried out at about ambient pressure.

In coating formulations containing resins with external emulsifiers, the rising of the emulsifier to the surface of the coating film may occasionally cause problems. In the present case, such problems can be overcome by means of di- or polyisocyanates which react with the emulsion. This modification of the emulsion can be carried out either by the so-called one-component method or by the two-component method. In the one-component method, the emulsion is generally reacted at about 60° C. with any suitable isocyanates, preferably aliphatic diisocyanates such as isophorone diisocyanate, 2,2-bis(4'-isocyanatocyclohexyl)propane, m-tetramethylxylylene diisocyanate, the isocyanurate of hexamethylene diisocyanate, or polyfunctional allophanates or biurets. Reaction with such isocyanates results in the formation, via urethane and urea bridges, of a structure which is similar to that of a microgel.

In another variation of the one-component method, it is also possible to add the polyisocyanates before emulsifying the polymer solution and to allow reaction to take place. This partially crosslinked solution is then emulsified with water by the process described above. This variant has the advantage that it permits the use of aromatic as well as aliphatic polyisocyanates.

In the two-component technique, the isocyanate is not added until directly prior to further processing.

Likewise, in order to avoid the emulsifier rising, the emulsifier/polyvinyl butyral/resin (if included) melt may be modified using polyacids. Typical acids for this purpose are, for example, adipic acid, isophthalic acid, terephthalic acid, trimellitic acid and the anhydrides of these acids. If modification with these acids is carried out such that a residual acid content remains, improved pigment compatibility and shear stability of the polyvinyl butyral emulsion is also achieved. Preferably, the acid number should be in the range of 1 to 20 mg KOH/g, particularly 1 to 10 mg KOH/g.

Films based on emulsions modified according to the present invention exhibit outstanding hardness, water and solvent resistance and protection against corrosion, as well as good adhesion to metal and plastic. Since primers produced using these emulsions exhibit a good adhesion to intermediate coats, good overcoatability is also achieved.

The emulsions made according to the invention, whether unmodified or modified as described with polyisocyanates or polyacids, are employed as binders for wash primers, industrial coatings, temperature-resistant coatings such as coatings for heating elements, packaging coatings, adhesive primers, welding primers, parquetry coatings, roadmarking paints, adhesives and co-binders in adhesive formulations. The emulsion may also be employed in any other suitable use.

EXAMPLES

1. Emulsion containing an aprotic solvent 30 g of emulsifier, comprising bisphenol A diglycidyl ether and polyethylene glycol 4000 (number average molar mass is 4000 g/mol) as in U.S. Pat. No. 4,886,845 ("emulsifier 1"), 300 g of plasticizer resin comprising bisphenol A diglycidyl ether, phenol and bisphenol A as in EP-A 152,793 (Beckopox® EM 460, solvent-free) and 71 g of Solvesso® 100 are dissolved with one another at increasing temperature (from 60° C. to 100° C.). 316 g of polyvinyl butyral (Mowital® B20H) is then added to this solution and dissolved to homogeneity at temperatures up to 130° C. The solution is cooled to 90° C. and emulsified with 180 g of deionized water at a peripheral speed of 6.3 m/s, at a temperature which decreases down to 60° C. The batch is stirred under these conditions for one hour. This preemulsion is diluted to the final concentration using 280 g of deionized water. The resulting emulsion has a solids content of 50.6%, a viscosity at 23° C. of 2100 mPa.s and a pH of 6.5.

2. Emulsion containing a mixture of protic and aprotic solvents 30 g of "emulsifier 1", 300 g of Beckopox® EM 460, solvent-free, 12.6 g of butylglycol and 157.4 g of Solvesso® 100 are dissolved with one another as in Example 1 with the application of heat. 300 g of Mowital® B30HH is added to this solution and dissolved therein at temperatures of up to 130° C. After emulsification, corresponding to the conditions described in Example 1, the resulting emulsion has a solids content of 50%, a viscosity at 23° C. of 429 mPa.s and a pH of 6.5.

3. Emulsion modified with polyisocyanates after emulsification 6.3 g of isophorone diisocyanate are added dropwise at 60° C. to the emulsion comprising 30 g of "emulsifier 1", 300 g of Beckopox® EM 460, solvent-free, 171 g of Solvesso® 100, 300 g of Mowital® B30HH and 465.3 g of deionized water, as prepared by Example 1, and the components are stirred together with one another until all of the isocyanate has reacted. The resulting emulsion has a solids content of 51.9%, a viscosity at 23° C. of 1130 mPa.s and a pH of 6.5.

4. Emulsion modified with polyisocanates prior to emulsification

A solution is prepared by Example 1, by dissolving 30 g of "emulsifier 1", 300 g of Beckopox® EM 460, solvent-free, 171 g of Solvesso® 100 and 300 g of Mowital® B30HH with each other at increasing temperatures. This solution is reacted with 6.3 g of isophorone diisocyanate at 90° C. to give the urethane, until no further isocyanate can be detected. Subsequently, this solution is emulsified in accordance with Example 1 using 465.3 g of deionized water. The resulting emulsion has a solids content of 51.6%, a viscosity at 23° C. of 948 mPa.s and a pH of 6.8.

5. Emulsion modified with polyacids prior to emulsification

5a. Modification of the emulsifier

A mixture of 100 g of "emulsifier 1" and 6 g of trimellitic anhydride is heated to 130° C. 0.02 g of dibutyltin oxide (esterification catalyst) is added and then the mixture is maintained at this temperature for 1 hour before being cooled. The product has an acid number of 33 mg of KOH/g.

5b. Modification of the polyvinyl butyral melt and emulsification 200 g of Beckopox® EM 460 and 200 g of Mowital® B30HH are mixed with one another at 200° C. 20 g of emulsifier as in Example 5a is added to the clear melt. After addition of 0.1 g of dibutyltin oxide, water is distilled off under vacuum (50 mbar) at 200° C. until the acid number of the melt is zero. Then 3.3 g of trimellitic anhydride is added at 120° C. and the temperature is maintained for about 1 hour until the acid number has reached 4.6 mg of KOH/g.

After addition of 110 g of Solvesso® 100 and cooling to from 90° to 100° C., emulsification is carried out as in Example 1. The resulting aqueous emulsion has a solids content of 51 1%, a viscosity at 23° C. of 702 mPa.s and a pH of 3.2.

What is claimed is:

1. A process for the production of an aqueous polyvinyl butyral containing emulsion comprising the steps of:
   (a) mixing a nonionic emulsifier with a polyvinyl butyral to form a mixture;
   (b) adding at least one of an aromatic polyisocyanate and an aliphatic polyisocyanate;
   (c) subjecting the mixture to shear forces; and
   (d) adding water to the mixture while the mixture is being subjected to the shear forces.

2. A process for the production of an aqueous polyvinyl butyral containing emulsion comprising the steps of:
   (a) mixing a nonionic emulsifier with a polyvinyl butyral to form a mixture;
   (b) subjecting the mixture to shear forces; and
   (c) adding water to the mixture while the mixture is being subjected to the shear forces, and thereafter adding at least one aliphatic polyisocyanate.

3. An aqueous polyvinyl butyral emulsion prepared by a process comprising the steps of:
   (a) mixing a nonionic emulsifier with a polyvinyl butyral to form a mixture;
   (b) adding at least one of an aromatic polyisocyanate and an aliphatic polyisocyanate;
   (c) subjecting the mixture to shear forces; and
   (d) adding water to the mixture while the mixture is being subjected to the shear forces.

4. An aqueous polyvinyl butyral containing emulsion prepared by a process comprising the steps of:
   (a) mixing a nonionic emulsifier with a polyvinyl butyral to form a mixture;
   (b) subjecting the mixture to shear forces; and
   (c) adding water to the mixture while the mixture is being subjected to the shear forces, and thereafter adding at least one aliphatic polyisocyanate.

5. A process according to claim 1, further comprising the step of heating the nonionic emulsifier to approximately 60° to 100° C. before the addition of the polyvinyl butyral.

6. A process according to claim 1, further comprising the steps of:
   terminating the addition of water when the solids content of the emulsion is about 60 to 70%; and
   thereafter stirring the emulsion for about one hour at a temperature of less than about 70° C.

7. An emulsion according to claim 3, wherein at least one solvent is mixed with the nonionic emulsifier and the polyvinyl butyral before step (b).

8. A method of coating a substrate, comprising the steps of adding an aliphatic or aromatic polyisocyanate to the coating formulation of claim 3, and applying the coating formulation to the substrate shortly after the addition of the polyisocyanate.

9. An emulsion according to claim 4, wherein at least one solvent is mixed with the nonionic emulsifier and the polyvinyl butyral before step (b).

10. A method of coating a substrate, comprising the steps of adding an aliphatic or aromatic polyisocyanate to a coating formulation containing the emulsion of claim 4, and applying the coating formulation to the substrate shortly after the addition of the polyisocyanate.

11. A process according to claim 2, further comprising the step of heating the nonionic emulsifier to approximately 60° to 100° C. before the addition of the polyvinyl butyral.

12. A process according to claim 2, further comprising the steps of:

terminating the addition of water when the solids content of the emulsion is about 60 to 70%; and thereafter stirring the emulsion for about one hour at a temperature of less than about 70° C.

13. A process according to claim 1, wherein the aliphatic polyisocyanate is selected from the group consisting of isophorone diisocyanate, 2,2-bis(4'-isocyanatocyclohexyl) propane, m-tetramethylxylyene diisocyanate, the isocyanurate of hexamethylene diisocyanate, and polyfunctional allophanates or biurets.

14. A process according to claim 2, wherein the aliphatic polyisocyanate is selected from the group consisting of isophorone diisocyanate, 2,2-bis(4'-isocyanatocyclohexyl) propane, m-tetramethylxylyene diisocyanate, the isocyanurate of hexamethylene diisocyanate, and polyfunctional allophanates or biurets.

15. A process for the production of an aqueous polyvinyl butyral containing emulsion comprising the steps of:

(a) mixing a nonionic emulsifier with a polyvinyl butyral to form a mixture;

(b) adding at least one compound selected from the group consisting of adipic acid, isophthalic acid, terephthalic acid, trimellitic acid and anhydrides thereof;

(c) subjecting the mixture to shear forces; and (d) adding water to the mixture while the mixture is being subjected to the shear forces.

16. An aqueous polyvinyl butyral containing emulsion prepared by a process comprising the steps of:

(a) mixing a nonionic emulsifier with a polyvinyl butyral to form a mixture;

(b) adding at least one compound selected from the group consisting of adipic acid, isophthalic acid, terephthalic acid, trimellitic acid and anhydrides thereof;

(c) subjecting the mixture to shear forces; and (d) adding water to the mixture while the mixture is being subjected to the shear forces.

17. A method of coating a substrate, comprising the steps of adding an aliphatic or aromatic polyisocyanate to the coating formulation of claim 16, and applying the coating formulation to the substrate shortly after the addition of the polyisocyanate.

18. A process according to claim 15, further comprising to 100° C. before the addition of the polyvinyl butyral.

19. A process according to claim 15, further comprising the steps of:

terminating the addition of water when the solids content of the emulsion is about 60 to 70%; and thereafter stirring the emulsion for about one hour at a temperature of less than about 70° C.

20. An emulsion according to claim 16, wherein at least one solvent is mixed with the nonionic emulsifier and the polyvinyl butyral before step (b).

* * * * *